April 6, 1971 TOMISABURO NARA ET AL 3,574,003

METHOD OF TREATING SEMI-HARD MAGNETIC ALLOYS

Filed Oct. 9, 1967 5 Sheets-Sheet 1

TOMISABURO NARA,
YUKIO KIYOTANI,
MUTSUO TOKUYOSHI, &
HUZIO HIRABAYASHI,
INVENTORS, by Stephen H. Frishauf
Atty 3,574,003

METHOD OF TREATING SEMI-HARD MAGNETIC ALLOYS

Tomisaburo Nara, Yukio Kiyotani, Mutsuo Tokuyoshi, and Huzio Hirabayashi, Tokyo, Japan, assignors to Nippon Telegraph and Telephone Public Corporation, Tokyo, Japan Filed Oct. 9, 1967, Ser. No. 673,714
Claims priority, application Japan, Oct. 14, 1966, 41/67,216; Mar. 10, 1967, 42/14,729
Int. Cl. H01f *1/00*
U.S. Cl. 148—120 7 Claims

ABSTRACT OF THE DISCLOSURE

Semi-hard magnetic alloy of a composition consisting of 1 to 20%, by weight, of Ni, 0.5 to 4.5%, by weight, of Al, 0.5 to 3%, by weight, of Ti, 0.01 to 5%, by weight, of Cu, if desired, and the rest of Fe. The alloy is heated to a temperature ranging from 300° C. to 900° C., cooled to a temperature below 300° C., and then cold rolled at a reduction rate of from 10 to 70% to further improve its magnetic characteristics.

This invention relates to magnetic alloys and more particularly to semi-hard magnetic alloys which have a coercive force larger than that of soft magnetic alloys but smaller than that of hard magnetic alloys and a high residual magnetisation. This invention also relates to a method of treating for improving the squareness ratio of the semi-hard magnetic alloys.

Magnetic materials having a coercive force larger than soft magnetic alloys but smaller than that of hard magnetic alloys are usually referred to as semi-hard magnetic alloys and their mechanical hardness is also intermediate of those of soft and hard magnetic alloys. The magnitude of the coercive force desired for these semi-hard magnetic alloys is generally from 20 to 80 oersteds. These semi-hard magnetic alloys are required to have a high residual magnetisation as well as a high squareness ratio. In addition, these semi-hard magnetic alloys should have high workability in order to form them into desired configuration suitable for their particular applications and have small variation in their magnetic properties with respect to temperature conditions of heat treatment in order to always give them constant magnetic properties.

Among well known alloy compositions which can substantially fulfil these requirements are included the Remendur composition of the standard composition consisting of 48% of Fe, 48% of Co and 4% of V (proposed by Bell Telephone Laboratories) and the VS–30 composition of the standard composition consisting of 30% of Co, 15% of Cr and 55% of Fe (proposed by Drupp). These and similar alloys contain Co as one of their essential ingredients, the percentage of cobalt content being dependent upon the magnetic characteristics, especially the residual magnetisation (Br) of the magnetic alloy.

In order that these known semi-hard magnetic alloys may have the desired magnetic characteristics they must be subject to a cold rolling of high reduction rates, usually about 90%, followed by final heat treatment for aging. Such a high reduction rate rolling improves the squareness ratio of the alloys while the heat treatment improves coercive force H*c*. However, as the rolling workabiilty of known semi-hard magnetic alloys is poor, when subject to cold rolling of the above mentioned high reduction rate, the alloys tend to form cracks, thus decreasing yield of satisfactory products. On the other hand, as the temperature of heat treatment of a value effective to improve the coercive force H*c* is substantially coincides with the temperature at which the residual magnetisation of the alloys decreases there is a tendency that alloys of excellent coercive force H*c* have low residual magnetisation B*r* whereas alloys of satisfactory residual magnetisation have low coercive force. Further, magnetic alloys that have been subject to the final heat treatment lose their ability of bending which is inherent to the alloys prior to said heat treatment with the result that alloys that have been imparted the desired magnetic characteristics can not be bent further. Moreover, these prior magnetic alloys are expensive because they contain high percentages of expensive cobalt.

Basic composition of the novel semi-hard magnetic alloy consists of from 1 to 20%, by weight, of Ni, from 0.5 to 4.5%, by weight, of Al, from 0.5 to 3%, by weight, of Ti and the remainder of Fe and this alloy maintains substantially constant residual magnetisation over the entire temperature range of final heat treatment necessary for improving the coercive force. This means that it is possible to readily obtain alloys having the desired coercive force without substantially varying the desired value of residual magnetisation, whereby to always provide alloys of constant magnetic characteristics. Further, as the novel alloy does not contain expensive cobalt the manufacturing cost thereof is far lower than that of prior magnetic alloys of the same type.

According to this invention there is also provided a novel method of treatment of the magnetic alloy having the above described composition which ensures improvements in its magnetic characteristics, especially the residual magnetisation and squareness ratio and in its mechanical properties such as rolling workability and bending workability. The novel method of treatment comprises the steps of heating to a temperature in a range of from 300 to 900° C. a metal blank of said composition, said blank having a configuration that can be cold worked, and then cold rolling the metal blank after cooling. By this combination of heat treatment and cold rolling the resulted magnetic alloy is imparted with satisfactory magnetic characteristics without relying upon the final heat treatment as well as excellent bending ability.

This invention will be more fully understood from the following detailed description taken in connection with the accompanying drawings, in which.

Novel semi-hard magnetic alloys embodying this invention comprise, as their essential compositions, from 1 to 20%, by weight, of Ni, from 0.5 to 4.5%, by weight, of Al, from 0.5 to 3%, by weight, of Ti and the rest of Fe. These magnetic alloys can be provided with satisfactory coercive force H*c* and residual magnetisation B*r* necessary for semi-hard magnetic materials when subject to conventional cold rolling steps and final heat treatment (aging) step. It is particularly to be noted that the novel magnetic alloy maintains substantially constant magnetisation irrespective of variations in the aging temperature thus enabling extremely easy control of the final heat treating temperature especially required for improving the coercive force of the novel alloy. Resulted alloys have a constant value of residual magnetisation B*r* and a value of coercive force H*c* most adequate for the particular composition.

In the novel magnetic alloy, aluminium content of less than 0.5%, by weight, results in unsatisfactory magnetic characteristics whereas content of more than 4.5%, by weight, results in excessive increase in the hardness of the alloy, thus rendering impractical to roll it.

Figure 1:
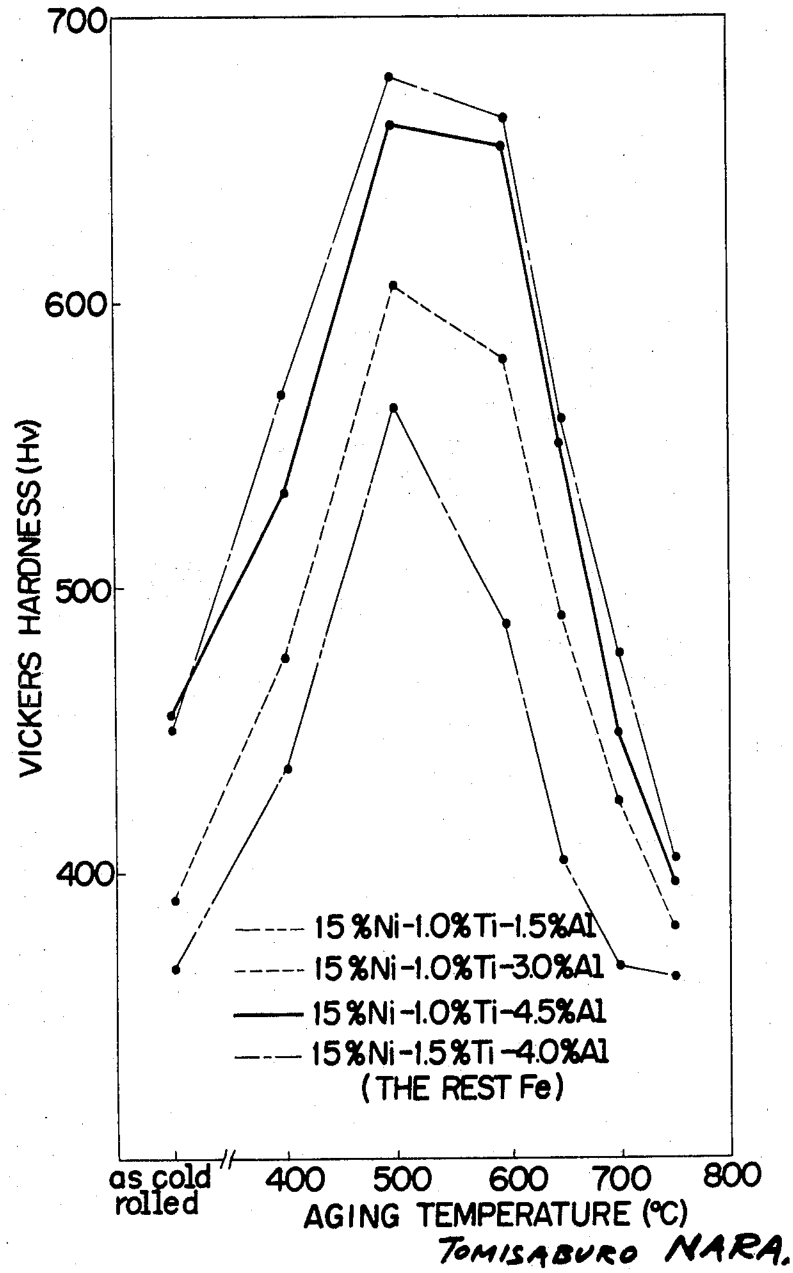
FIG. 1 shows a graph illustrating the effect of the variation in aluminium content upon the aging temperature and hardness of the magnetic alloys according to this invention.

FIG. 1 shows the effect of the variation in aluminium content of the alloys of Fe-Ni-Al-Ti series upon the hardness at various aging temperatures. In order to provide hardness of less than 700 on the Vickers hardness scale at which cold rolling is generally possible the content of aluminium should be less than 4.5% by weight. Alloys containing aluminium in excess of this limit have little cold rolling workability essential for semi-hard magnetic materials.

Although not so remarkable as in the case of aluminium, content of titanium also effects the magnetic characteristics and hardness of the alloy. More particularly, alloys containing less than 0.5%, by weight, of titanium manifest so large decrease in the magnetic characteristics that can not be compensated for by varying contents of other ingredients. On the other hand, titanium contents in excess of 3%, by weight, result in excessive hardness of the alloy.

Figure 2:
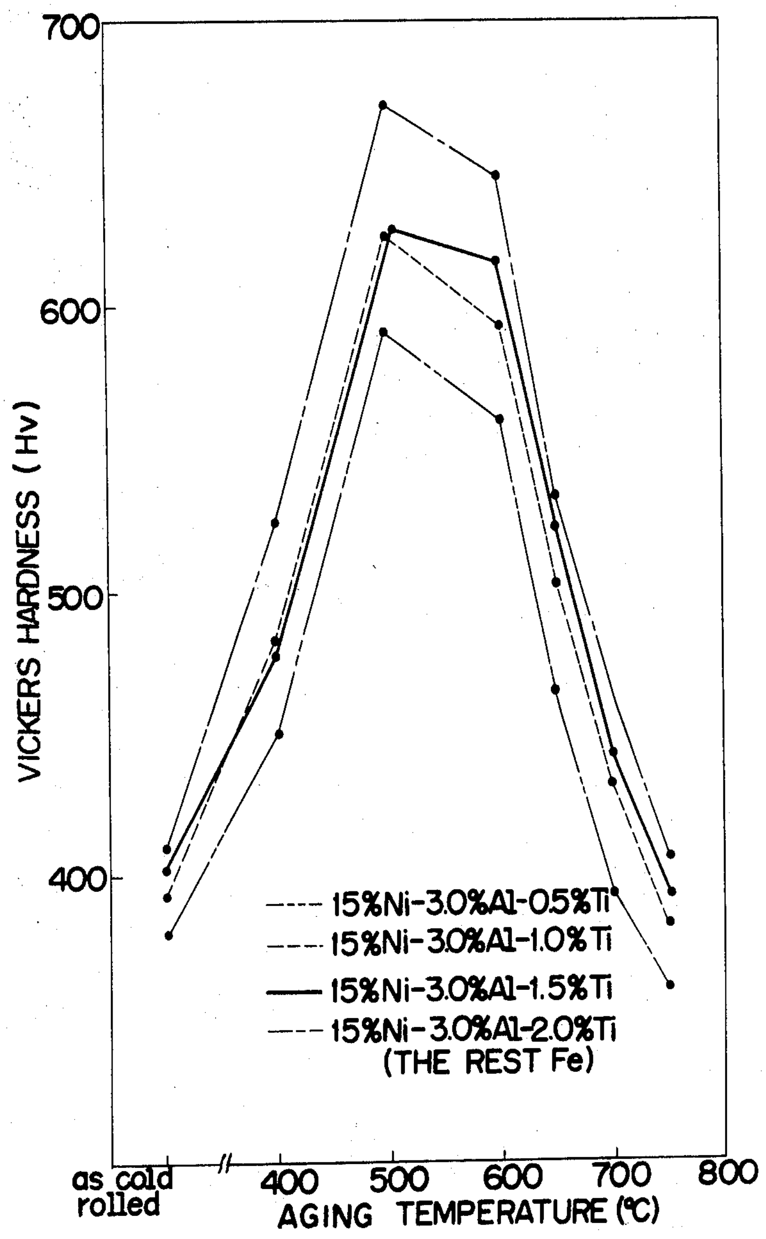
FIG. 2 shows a similar graph illustrating the effect of the variation in titanium content.

FIG. 2 shows the relation between the content of titanium and hardness in various alloys of the Fe-Ni-Al-Ti series. Similar to the case of aluminium, alloys that manifest satisfactory rolling workability at any aging temperature contain titanium in a range not more than 3%, preferably 2%, by weight.

Limits upon nickel content of the novel alloys of the Fe-Ni-Al-Ti series is mainly determined dependent upon a range in which the alloys can exhibit desired magnetic characteristics, said range being substantially equal to the already established range for magnetic alloys essentially consisting of iron and nickel. It was cound that the novel magnetic alloys which further contain from 0.01 to 5%, by weight, of copper to have improved magnetic characteristics, especially coercive force H*c*. Thus incorporation of copper is advantageous where higher value of coercive force is desired. However, since even alloys not containing copper have sufficiently high value of coercive force, incorporation of copper is limited to certain particular applications. Addition of copper in excess of 5%, by weight, does not improve the value of coercive force beyond that of the alloy containing less than 5%, by weight, so that 5% is a practical upper limit.

Alloys of this invention can be prepared by ordinary method. Most common method is identical to the method of preparing conventional semi-hard magnetic alloys comprising the steps of melting a raw material containing respective ingredients at a prescribed ratio, in an atmosphere of air, air of reduced pressure, hydrogen or inert gas, casting the molten alloy to form an ingot, forging or hot rolling the ingot at a temperature of about 1000° C., cooling to room temperature by means of air or water, cold rolling the alloy to obtain a sheet or plate of desired thickness, and subjecting the sheet to heat treatment for the purpose of aging. It is to be understood that the novel magnetic alloy materials are not limited to any particular method of manufacturing. Irrespective of their method of manufacturing the novel magnetic alloys have coercive force desired for semi-hard permanent magnets, generally a coercive force of from 20 to 80 oersteds and a satisfactory definite residual magnetisation inherent to the composition of the alloy. Such desirable magnetic properties are based on the fact that the residual magnetisation of the novel alloys does not change to any appreciable extent when subject to aging treatment at a temperature within a range effective to improve the coercive force of the alloys. In other words, aging treatment can be performed at temperatures assuring the highest coercive force without regarding variations of the residual magnetisation.

Magnetic alloys having such excellent magnetic characteristics are suitable for use as electromechanical switching elements utilised in electronic switching systems, magnetic cores of hysteresis motors and the like applications.

Further this invention provides a method of treatment for further improving magnetic characteristics and mechanical properties of the alloys having the above described composition.

According to the method of this invention the raw material of alloy, consisting of from 1 to 20%, by weight, of Ni, from 0.5 to 4.5%, by weight, of Al, from 0.5 to 3%, by weight, of Ti, from 0.01 to 5%, by weight, of copper which is incorporated when desired and the remainder of Fe, is first cast and rolled into a desired shape, subject the rolled blank to a heat treatment to heat it to a temperature in a range of from 300 to 900° C., then the rolled blank is cooled and is then cold rolled.

More in detail, the heat treatment is effected such that the rolled blank is maintained for a relatively short interval, for example, for 10 to 60 minutes, at a temperature ranging from 300 to 900° C. and then cooled. Cooling may be any one of natural air cooling, forced air cooling and quenching by water. Although it is not fully understood what type of variation is caused to occur in the structure of the alloy blank by this heat treatment, conventional semi-hard magnetic alloys increase their mechanical hardness by the heat treatment effected at temperatures capable of increasing mechanical hardness, whereas alloys of the composition according to this invention have a tendency to decrease their mechanical hardness. From this phenomenon it can be presumed that the heat treatment converts the structure of the alloy to a state different from that created by conventional aging treatment. The above heat treatment converts the structure of the alloy to a state different from that created by conventional aging treatment. The above heat treatment results in the decrease in the mechanical hardness of the blank and also in remarkable improvement of the magnetic characteristics after subsequent cold rolling.

Result of experiment showed that such advantages can be realised by heat treating temperatures in a range of from 300 to 900° C. When the heat treatment temperature is lower than 300° C., the mechanical hardness of the blank would not be lowered so that the rolling workability of the alloy is not sufficient. On the other hand temperatures exceeding 900° C. does not materially improve the magnetic characteristics of the alloy before and after cold rolling which is performed subsequent to heat treatment.

Heat treated blank is cold rolled at a reduction rate of from 10 to 70%. Reduction rates in this range assure more improved residual magnetisation B*r* and squareness ratio of the resulted alloy. Lower reduction rates decrease the degree of improvement of the magnetic characteristics of the alloy whereas too high reduction rates impair mechanical characteristics, especially bending workability.

Prior to heat treatment, the blank may be subject to any treatment. For example, after casting the blank may subject to forging, hot rolling, homogenising heat treatment and cold rolling. Further, after heat treatment and cold rolling the blank may be subject to aging treatment in order to have a fine adjustment of its magnetic characteristics.

While one heat treatment step combined with one cold rolling step is effective to improve the mechanical characteristics as well as the magnetic characteristics of the alloy, repeated heat treatment and cold rolling steps result in remarkable improvement of the characteristics of the alloy.

By the heat treatment of this invention followed by cold rolling the magnetic characteristics and mechanical characteristics of the alloy can be greatly improved. Among magnetic characteristics, improvements in the residual magnetisation and squareness ratio are remarkable. Generally, it is considered that, in order to provide magnetic materials having a high squareness ratio it is necessary to subject the material to a rolling step of high reduction rate to give directional property and chance to aging treatment in order to make a preferred texture in the blank. Contrary to such conventional recognition, according to this invention it is possible to obtain magnetic alloys having higher squareness ratio than any prior magnetic materials by subjecting the blank to a cold rolling operation of smaller reduction rate which is only 70% at the maximum. In addition, mechanical characteristics of the alloy, especially bending workability can be improved. Semi-hard magnetic materials are usually employed in the form of a thin sheet from the standpoint of their magnetic characteristics and to effectively utilising the available space, it is often required to bend the plate magnetic material. Such requirements cn be fulfilled by the magnetic materials treated in accordance with this invention and can be bent in any direction. This should be compared with conventional magnetic alloys which can not be bent, especially in a direction parallel to the direction of rolling after aging treatment.

The invention will be described more in detail in the following examples in which all percents are by weight.

EXAMPLE 1

Figure 3:
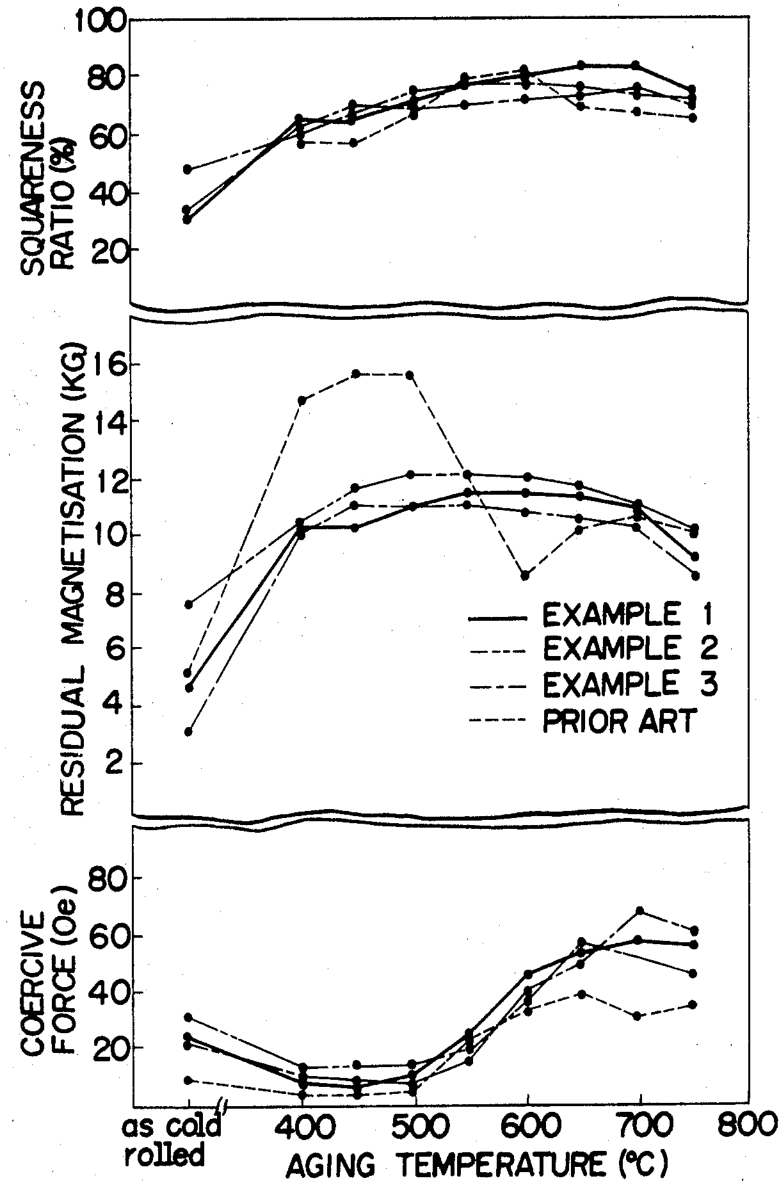
FIG. 3 shows a graph illustrating the comparison between the relation of aging temperature and variations in the coercive force, residual magnetism and squareness ratio of the novel magnetic alloy and of the prior art magnetic alloy.

A raw material of an alloy-consisting of 16% of Ni, 4.5% of Al, 1.5% of Ti, 5% of Cu and the rest of Fe was charged in an aluminous crucible and melted in a Tammann electric furnace. The molten alloy composition was cast in a cylindrical mould, the resulted ingot was forged into a square sheet of 8 mm. thick at a temperature of about 1,000° C., then the sheet was subject to an homogenising heat treatment at a temperature of about 1,000° C., then water quenched from a temperature of about 900° C. The quenched sheet was then cold rolled into a thin sheet having a thickness of 0.3 mm., and then the thin sheet was subjected to aging treatment at various aging temperatures for 30 minutes. Magnetic characteristics of the resulted magnetic material in the form of a thin sheet are depicted in FIG. 3.

EXAMPLE 2

A raw material of an alloy consisting of 20% of Ni, 4.5% of Al, 2% of Ti and the remainder of Fe was treated under the same conditions as in Example 1 to obtain a thin sheet of magnetic material having a thickness of 0.3 mm. Magnetic characteristics of this sheet are also depicted in FIG. 3.

EXAMPLE 3

A raw material of an alloy consisting of 18% of Ni, 4.5% of Al, 2% of Ti, 5% of Cu and the rest of Fe was subject to casting, forging, homogenising treatment and cold rolling steps under the same conditions as in Example 1 to obtain a thin sheet of magnetic material having a thickness of 0.3 mm. The magnetic characteristics of this thin sheet are also depicted in FIG. 3.

For comparison an alloy material having conventional composition consisting of 16% of Ni, 5% of Cu and the rest of Fe was treated under the same conditions as in FIG. 1 to obtain a thin sheet of 0.3 mm. thick, magnetic characteristics thereof being also depicted in FIG. 3.

As can be clearly noted from FIG. 3, the prior art magnetic material has a tendency of greatly decreasing the residual magnetisation B*r* at the temperature of aging treatment which provides the maximum coercive force H*c*, whereas the novel magnetic alloys shown in Examples 1 to 3 have substantially constant residual magnetisation B*r* over a temperature range effective for aging treatment. Further, with regard to the squareness ratio ($Br/B_{200}$) respective magnetic materials according to this invention exhibit extremely low rate of change for temperatures and yet the absolute value of the squareness ratio is comparable to that of prior art magnetic materials.

EXAMPLE 4

A raw material of an alloy consisting of 15% of Ni, 4.5% of Al, 1.5% of Ti and the remainder of Fe was put in an aluminous crucible, melted in a Tammann electric furnace in an atmosphere of air and the molten alloy was cast in a cylindrical mould. The ingot thus obtained was forged into a sheet of 15 mm. thick and 50 mm. wide at a temperature of about 1,000° C. and the sheet was then hot rolled to a thickness of about 7 mm. at a temperature of about 900° C. to 1,000° C. After polishing to remove surface defects the sheet was cold rolled to produce a sheet of 1.6 mm. thick.

The sheet thus prepared was heated to a temperature of 680° C. for 30 minutes and then water quenched. The quenched sheet was again cold rolled at a reduction rate of 50%, until a final thickness of 0.2 mm. was reached. The resulted sheet was subject to an aging treatment of heating to a temperature of 650° C. for 30 minutes and then magnetised in the same direction as the direction of rolling. The demagnetisation curve of hysteresis of the magnetised sheet is shown by solid line in FIG. 4.

From comparison an alloy, material of the same composition was treated under the same conditions as described just above until it is hot rolled to a sheet of 7 mm. thick. Thereafter the sheet was cold rolled to obtain a sheet of 0.2 mm. thick without subjecting to heat treatment according to the prior method. The thin sheet thus obtained was magnetised in the same direction and demagnetisation curve of hysteresis thereof is shown by dotted line in FIG. 4.

The following table shows the comparison between magnetic characteristics of the novel material and those of prior material.

| Magnetic characteristics | Material treated in accordance with the invention | Material treated by prior method |
|---|---|---|
| H*c* (oersted) | 41.8 | 42.0 |
| B*r* (gauss) | 15,200 | 12,000 |
| B*m* (gauss) | 14,200 | 10,000 |
| $Br/B_{200}$ (percent) | 93.5 | 83.5 |
| $(B\cdot H)_{max}$ ($10^6$G·Oe.) | 0.540 | 0.315 |

Figure 4:
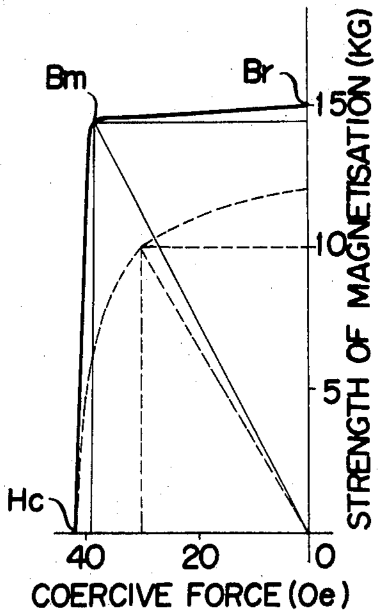
FIG. 4 shows demagnetisation curve of hysterisis of the novel magnetic alloy and of the prior art magnetic alloy.

The result shown in this table and FIG. 4 clearly show that magnetic materials treated in accordance with this invention have higher residual magnetisation B*r* and squareness ratio in $Br/B_{200}$ than those treated by prior method. Further, magnetic materials treated in accordance with this invention can be bent in any direction but those treated by prior method can not be bent, especially in a direction parallel to the direction of rolling without accompanying cracks.

EXAMPLE 5

A raw material of an alloy consisting of 17% of Ni, 3% of Al, 1% of Ti and the rest of Fe was treated under the same conditions as in Example 1 except that the alloy was cold rolled to a sheet of 1.6 mm. thick, the sheet was then heated at a temperature of 700° C. for 30 minutes, quenched by water and then again cold rolled at a reduction rate of 30%. The sheet was further cold rolled to obtain a thin sheet of 0.2 mm. thick which was then magnetised in the same direction as the direction of rolling. The relation between the aging treatment performed prior to magnetisation and the temperature is indicated in FIG. 5.

A sample of the alloy material having the same composition as in Example 5 was cold rolled under the same conditions as in Example 1 until a sheet of 1.6 mm. thick was obtained. After subject to an intermediate aging treatment including the steps of heating to a temperature of 950° C. for 30 minutes and then cooling slowly, the sheet was cold rolled to a thickness of 0.2 mm. The resulted sheet was magnetised in a direction parallel to the direction of rolling. The relation between the temperature of aging treatment made upon this sheet prior to magnetisation and the magnetic characteristics is shown in FIG. 5.

Figure 5:
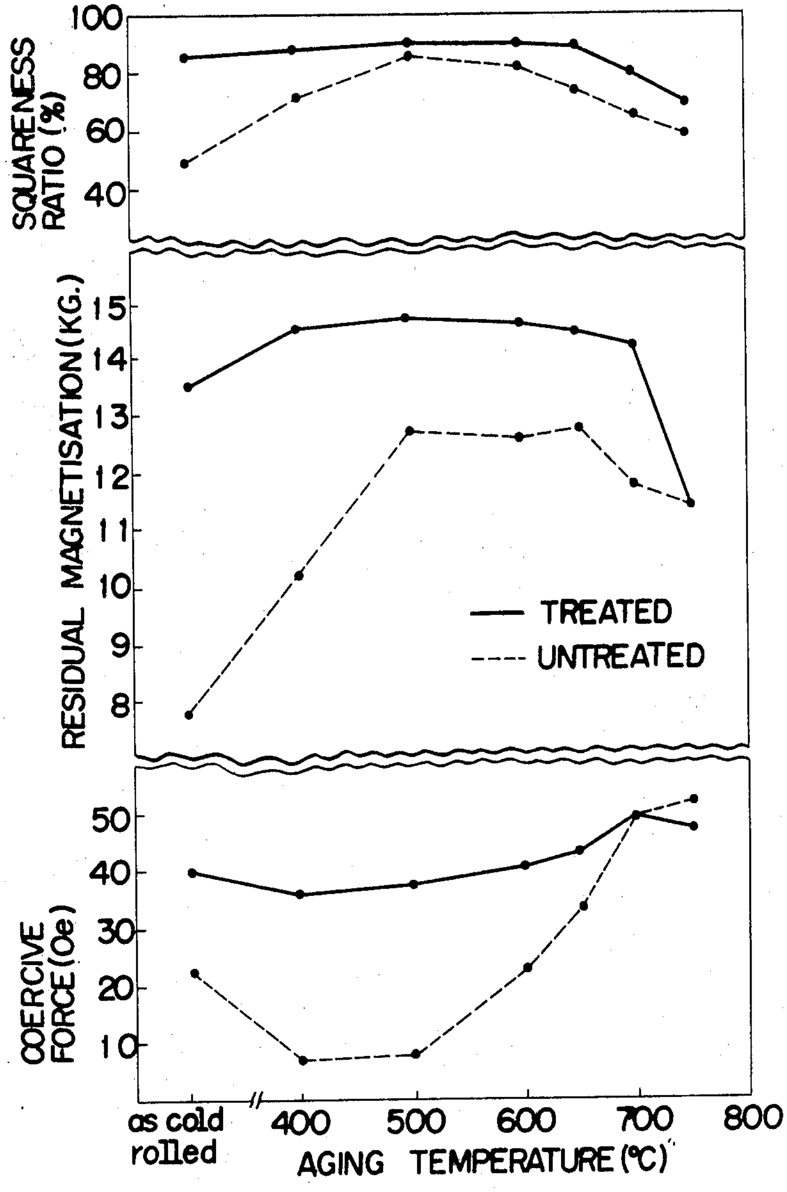
FIG. 5 shows a graph illustrating the comparison between the relation of the aging temperature and variations in the coercive force, residual magnetisation and squareness ratio of the novel magnetic alloy and of the prior art magnetic alloy.

From FIG. 5, which shows comparison of these two types of materials, it can be clearly noted that the absolute values of the coercive force and the residual magnetisation of the magnetic material treated in accordance with this invention are greatly improved and that these absolute values are substantially independent of the variation in the aging temperature. On the other hand, when subject to heat treatment at temperatures with an effective range of aging, i.e. from 500° C. to 600° C., mechanical hardness of alloys treated according to this invention is only about two thirds of that of the alloy not treated.

While the invention has been described in connection with some preferred embodiments thereof, the invention is not limited thereto and includes any modifications and alternations which fall within the true spirit and scope of the invention as defined in the appended claims.

What is claimed is:

1. In a method of treating a semi-hard magnetic alloy including a step of cold rolling a cast alloy blank, the improvement wherein said alloy blank comprises from 1 to 20%, by weight, of Ni, from 0.5 to 4.5%, by weight, of Al, from 0.5 to 3%, by weight, of Ti and the remainder of Fe, and said alloy blank is subject to a heat treatment-cold rolling treatment which comprises the steps of heating said alloy blank to a temperature ranging from 300° C. to 900° C. and cooling the heated blank to a temperature below 300° C., and then cold rolling the blank at a reduction rate ranging from 10 to 70%.

2. The method according to claim 1 wherein said alloy blank further comprises from 0.01 to 5%, by weight, of Cu and the remainder of Fe.

3. The method according to claim 1 wherein said cooling is effected by air.

4. The method according to claim 1 wherein said cooling is effected by water quenching.

5. The method according to claim 1 wherein said alloy blank is subject to any one of treatments including the steps of forging, hot rolling, heat treatment for homogenising and preliminary cold rolling prior to said heat treatment-cold rolling treatment.

6. The method according to claim 1 wherein said alloy blank is subjected to said heat treatment-cold rolling treatment more than two times.

7. The method according to claim 1 wherein said alloy blank is subject to aging treatment for finely adjusting its magnetic characteristics subsequent to said heat treatment-cold rolling treatment.

References Cited

UNITED STATES PATENTS

| | | | |
|---|---|---|---|
| 1,987,468 | 1/1935 | Dahl et al. | 148—120 |
| 2,075,283 | 3/1937 | Heinzel et al. | 148—120 |
| 2,123,138 | 7/1938 | Hiemenz | 148—120 |
| 2,156,019 | 4/1939 | Jonas | 148—101X |
| 2,167,188 | 7/1939 | Schaarwächter et al. | 148—102 |
| 2,499,862 | 3/1950 | Hansen | 148—102X |
| 2,810,085 | 10/1957 | Akeley | 148—120X |

L. DEWAYNE RUTLEDGE, Primary Examiner

G. K. WHITE, Assistant Examiner

U.S. Cl. X.R.

148—121, 31.55